United States Patent

[11] 3,622,907

[72] Inventors Richard Giles Tomlinson
Glastonbury;
Boyce Burdick, Vernon, both of Conn.
[21] Appl. No. 6,090
[22] Filed Jan. 27, 1970
[45] Patented Nov. 23, 1971
[73] Assignee United Aircraft Corporation
East Hartford, Conn.

[54] COMPOSITE OSCILLATOR AMPLIFIER LASER
4 Claims, 7 Drawing Figs.
[52] U.S. Cl.......................................................... 331/94.5,
330/4.3
[51] Int. Cl........................................................... H01s 3/05
[50] Field of Search............................................. 331/94.5;
330/4.3

[56] References Cited
UNITED STATES PATENTS
3,510,796   5/1970   Ahsmann .................... 331/94.5

*Primary Examiner*—Ronald L. Wibert
*Assistant Examiner*—T. Major
*Attorney*—Melvin Pearson Williams ABSTRACT: Two mirrors forming an optical cavity about an axis through their geometric centers are shaped and positioned to allow regions within the cavity where laser oscillation and amplification can occur. The cavity is formed by a relatively large first mirror having a reflection surface of concave contour and a smaller second mirror having a compound reflection surface of essentially convex contour, the compound mirror having a curved outer reflection surface surrounding a central flat reflection surface. The cavity, filled with a gas of high optical gain, supports electromagnetic energy oscillations between the central surface of the first mirror and the flat surface of the second mirror. A portion of the oscillation energy spills over around the flat surface of the second mirror, is reflected from the adjacent spherical surface as a beam of energy and the beam is amplified in passing back toward the outer surface of the first mirror through a gas medium of high saturation intensity. The amplified beam is reflected from the outer surface of the first mirror, further amplified and finally passed out of the cavity. A spherical as well as a cylindrical geometric embodiment are disclosed.

INVENTORS
RICHARD G. TOMLINSON
BOYCE BURDICK

Melvin T. Williams
BY             ATTORNEY

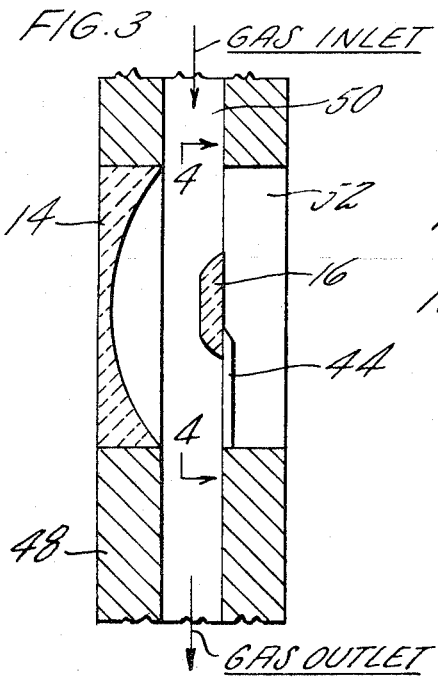
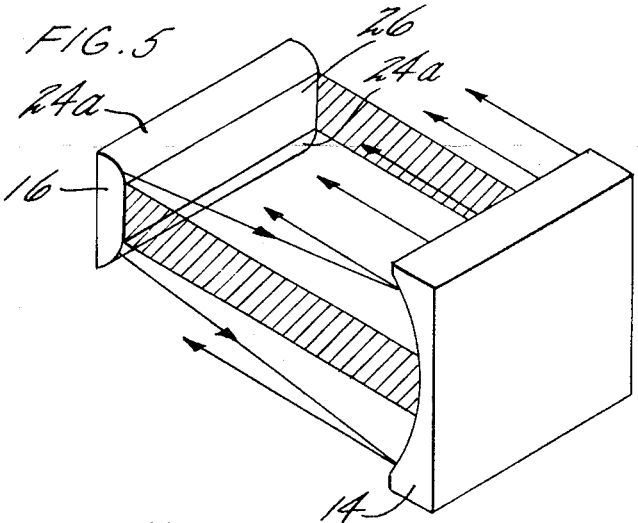
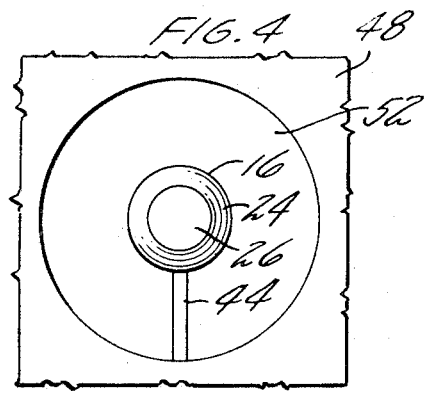
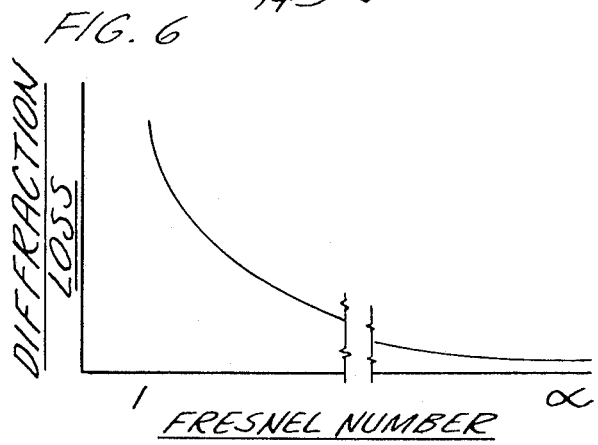
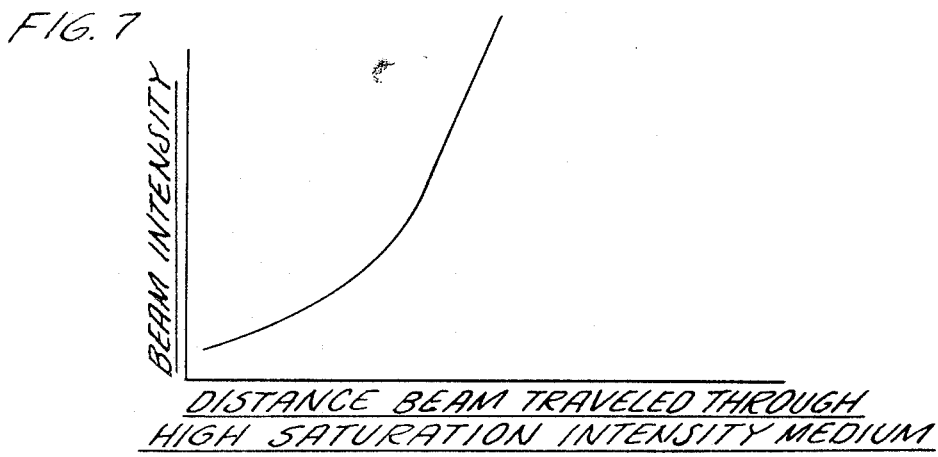

3,622,907

COMPOSITE OSCILLATOR AMPLIFIER LASER

BACKGROUND OF THE INVENTION

1. Field of Invention

This invention relates to lasers and more particularly to a composite oscillator-amplifier laser.

2. Description of the Prior Art

There are many laser configurations described in the prior art and there is a continuing development of lasers having high power output of good optical quality. As the laser art progresses, higher power systems are being sought and the efficient production of laser beams present new problems.

It is known that the operation of a laser as an amplifier is preferred to the operation of a laser as a oscillator. Although the amplifier requires a stimulating signal from an external source, it is still considered desirable since higher output power and better efficiency are possible than with an oscillator type laser. First, the energy flux necessarily maintained within an oscillator cavity is generally one to two orders of magnitude higher than the flux output from the oscillator. In an amplifier arrangement, by way of contrast, there is no need to maintain a similar high flux internal within the cavity; rather a stimulating signal passes through the gain medium wherein it increases in intensity and a beam of full output power then leaves the cavity. Further, the oscillator has inherent heating and coupling losses in its mirrors, particularly its output mirror due to present limitations in mirror fabrication and in the techniques for coupling such energy out of the oscillator. For example, if hole coupling is used, the optical properties of the beam are degraded and relatively high mirror-heating losses occur. More specifically, as the size of the output coupling hole of the output mirror is decreased, the collimation of the beam is degraded. Still further, with a hole in one of the mirrors in an oscillator, the peak intensity of the energy within the cavity tends to shift away from the hole area, increasing the intensity of the energy in the areas immediately adjacent to the hole. This is undesirable since it decreases the intensity of the signal taken from the cavity and it also causes a higher flux to intercept the mirror surfaces surrounding the hole resulting in high heating losses thereon. A partially transparent mirror is similarly undesirable since it is limited in the power transmissible without excessive heating losses in the mirror.

These difficulties have been circumvented in part by extracting laser energy from a gain medium in an amplifier configuration rather than an oscillator configuration. However, the saturation intensity of the laser medium (defined as that intensity which drops the gain coefficient of a negative temperature medium by a factor of 2; stated in different terms, it can be considered to exist when the energy of half of the population-inverted gas molecules of the gain medium is converted into laser energy) becomes significant. If a laser medium is subjected to a stimulation laser signal of low intensity, the laser signal increases in intensity exponentially as it traverses the gain medium taking advantage of only a portion of the inverted population of the gas. This would be an inefficient use of the gain medium. For an optical amplifier to most effectively convert the available energy stored in a gain medium into a laser beam, it should receive a stimulating signal having an intensity generally similar in magnitude to the saturation intensity of the gain medium. Conversely, if a high-intensity stimulation signal is introduced into a medium having an inverted population density, theoretically all of the available energy population of the medium can be converted, and a more intensity output laser beam produced.

Thus the efficient utilization of high-saturation intensity media in an amplifier requires a stimulation input signal of high intensity and this required signal can be supplied by a separate laser oscillator provided that heating of the oscillator output mirror is not excessive. A very desirable amplifier configuration would eliminate the need for separate oscillator apparatus to provide a stimulation signal to the amplifier and further avoid the output mirror limitations described.

SUMMARY OF THE INVENTION

A primary object of this invention is to extract the energy available in a high-gain, high saturation intensity gas laser medium as a laser beam.

Another object of this invention is to efficiently convert the inverted molecular population of a high saturation intensity gas medium into an intense laser beam.

It is a further object of this invention to provide an intense laser beam of good optical quality.

According to the present invention, a pair of curvilinear mirrors, one concave and one compound convex with a centrally disposed optical flat, comprise a composite laser oscillator amplifier. In accordance with the present invention, energy contained in a high-gain gas lasing medium is converted to a highly intense laser beam in a composite laser oscillator-amplifier. A laser cavity is established by the two mirrors, the cavity comprising a central oscillator region, formed between the flat and the center of the concave mirror, and an outer amplifier region which is external to the oscillator. A portion of the energy produced in the oscillator region is diffraction coupled into the amplifier region where it is increased in intensity and then reflected out of the cavity.

A feature of this invention is that it allows the operation of a high-power amplifier without a separate oscillator device to provide the stimulation input signal required by the amplifier.

Another feature of this invention is that it provides a laser beam without distortion.

A further feature of this invention is that it allows operation of a laser oscillator in a preferred fundamental mode.

This invention has the advantage of permitting a reduction of the heating provided to the output mirror in the high-power oscillator.

The foregoing and other objects, features and advantages of the present invention will become more apparent in the light of the following detailed description of the preferred embodiments thereof as illustrated in the accompanying drawing.

BRIEF DESCRIPTION OF THE DRAWING

FIG. 3 is a sectioned side elevation of the present invention.

FIG. 4 is a front elevation view taken along the line 4—4 of FIG. 3.

FIG. 5 is a perspective view of an alternative, cylindrical embodiment of the present invention.

FIG. 6 is a graphic illustration of the diffraction losses of an optical cavity as a function of Fresnel number.

FIG. 7 is a graphic illustration of the laser intensity buildup in a gain medium as a function of distance into the medium.

DESCRIPTION OF THE PREFERRED EMBODIMENT

Figure 1:
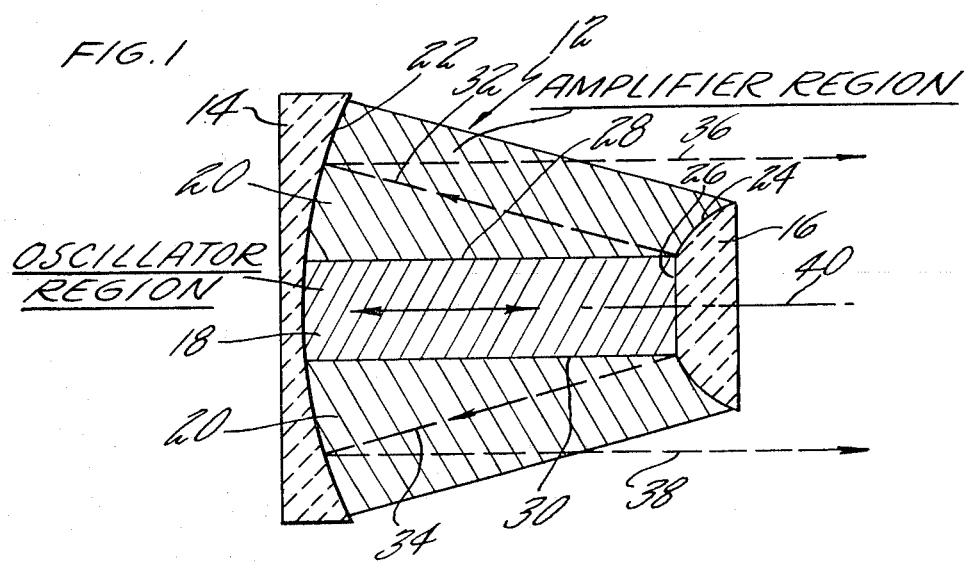
FIG. 1 is a simplified illustration of a laser oscillator-amplifier in accordance with the present invention.

Referring to FIG. 1, an optical cavity, general reference character 12, is established between a pair of mirrors 14, 16. The optical cavity has both a cylindrical oscillator region 18 centrally located within the cavity and a conic amplifier region 20 which is external to the oscillator region. The mirror 14 has a concave spherical reflective surface 22 and the mirror 16 has a compound surface including a convex spherical surface or area 24 and a flat surface or area 26.

The oscillator region is established between the flat surface 26 and the central area of the spherical surface 18. When a high-gain medium is brought between the mirrors, emitted rays 28, 30 occur in the oscillator region as stimulated electromagnetic emission from the medium. The emitted rays travel back and forth between the flat surface 26 and the center of the spherical surface 18.

The amplifier region is established within the region 20 between the mirrors 14, 16 and external to the oscillator region 18. When a high saturation intensity medium is brought into the amplifier region 20, diffracted rays 32, 34 are coupled into the amplifier region by reflection from the spherical surface 24 of the convex mirror 16, the diffracted rays increasing in intensity in accordance with the relationship shown in FIG. 7 as they pass through the amplifier region. The diffracted rays are then reflected by the spherical surface 22 of the mirror 14 as rays 36, 38. The rays 36, 38 are still further amplified again in accordance with the relationship shown in FIG. 7 as they make a second transit through the amplifier region before emerging as a beam of very intense energy, collimated along an optical or geometric axis 40 of the oscillator amplifier.

Figure 2:
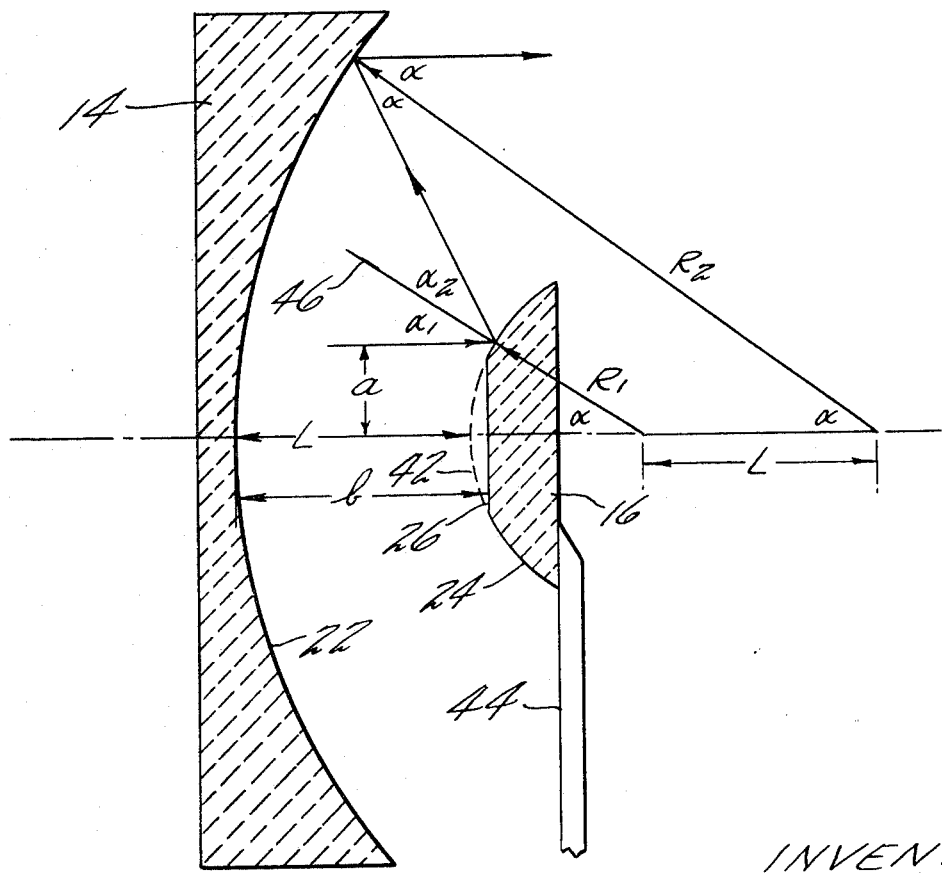
FIG. 2 is a sectioned, partially broken away schematized side elevation of the present invention in spherical geometry.

The preferred embodiment of this invention is illustrated in FIGS. 2, 3 and 4. Referring to FIG. 2, an important parameter of this invention is the characteristic Fresnel number (a dimensionless parameter of an optical system) of the oscillator region. The Fresnel number ($N_f$) is determined by the relationship $$N_f = a^2/\gamma b$$

where
$a$ = the radius of the oscillator cavity 18 cross section,
$b$ = the length of the cavity or the distance between the concave mirror surface 22, and the flat mirror surface 26 measured along the optical axis 40, and
$\gamma$ = the wavelength of the electromagnetic radiation produced in the cavity.

A fresnel number of approximately one is selected so that the oscillator will operate in its fundamental mode and approximately 30 percent of the oscillation energy will be coupled from the oscillator region into the amplifier region and increased in intensity.

The quantitative relationship between diffraction loss from the optical cavity and Fresnel number of the oscillator is shown in FIG. 6.

A stable oscillator exists in region 18 as long as $b \leq R_1$. The dimension "L" is the distance between the surface 22 and the extended spherical surface 42 of the mirror 16, measured along the cavity axis. A stable oscillator does not exist in region 20 as long as the following stability criterion is met, $$[1-(L/R_1)][1+(L/R_2)] > 1 \text{ where}$$

$R_1$ = the radius of curvature of the concave mirror,
$R_2$ = the radius of curvature of the convex mirror, and
$L$ = the distance defined by one half of the sum of $R_1$ and $R_2$.

The energy diffractively coupled out of the oscillator region from the compound mirror is reflected from the spherical surface 24 of the mirror 16 supported by a structural member 44 such as a rod or tube. The path for any light ray so reflected intercepts the spherical surface 24 with an angle of incidence $\alpha_1$ and departs with an angle of reflection $\alpha_2$ in accordance with ray optics. (The angle of incidence is the angle formed by the incident ray and the line normal to the reflecting surface 46 at the point where the ray is incident upon the surface. The angle of incidence and the angle of reflection are equal.) All the angles designated by an $\alpha$ in FIG. 2 are of equal magnitude when tracing the geometric path of any given ray through the oscillator amplifier. It should be noted, however, that the magnitude of $\alpha_1$ increases as the point of incidence moves farther away from the optical axis 40 along the surface 24 as it will for different ray paths. A result is that the total diffracted beam (that is the energy reflected by the convex surface 24) is spread over a larger area of the concave surface 22 than the area correspondingly covered by the same energy on the convex surface 24. The spreading of the beam does not reduce the radiant flux (energy emitted per unit time) in any manner, but it does not reduce the beam intensity (radiant flux per unit solid angle) thereby allowing greater amplification of the beam without reaching an intensity per unit area which could damage the mirror.

In FIG. 3, the preferred embodiment is shown in a containing environment. The mirrors 14, 16 are held in place by a containment vessel 48, such as a duct, preferably a rectangular channel. The channel supports the mirrors, forms a gas passage way 50, and directs the lasing gas to and from the laser cavity. The concave mirror is firmly embedded in the channel wall and the convex mirror is attached to the channel wall through the structural member 44. An opening 52, sufficiently large to pass the energy reflected from the concave surface, is provided in the channel wall behind the convex mirror.

Another embodiment of the present invention is illustrated in FIG. 5. Therein, instead of substantially spherical geometry for the mirror surfaces, the surfaces have cylindrical geometry, although in side cross section, the mirror surfaces of either geometry would appear as in FIG. 1.

Although the invention has been shown and described with respect to preferred embodiments thereof, it should be understood by those skilled in the art that the foregoing and various changes and omissions in the form and detail thereof may be made therein without departing from the spirit and the scope of the invention.

Having thus described typical embodiments of our invention, that which we claim as new and desire to secure by Letters Patent of the United States is:

1. A gas laser comprising:
a pair of mirrors forming an optical cavity having an axis;
a first one of said mirrors having a concave reflective surface forming one end of the cavity and symmetrically located about said axis;
the second one of said mirrors having a compound reflective surface comprising a convex reflective area centered about a central flat reflection area, said second mirror being symmetrically positioned about said axis and forming the other end of the cavity said flat area being normal to said axis; and
said first and second mirrors forming an oscillator region between a central area of said first mirror and said flat area and forming an amplifier region between said convex surface and remaining portions of said first mirror.

2. A laser according to claim 1 where in the second mirror has a central flat surface with a diameter which provides an oscillator Fresnel number of about unity.

3. A gas laser comprising:
a pair of mirrors forming an optical cavity having an axis;
the first mirror having a spherical concave reflection surface and forming one end of the cavity and being symmetrically located about said axis;
the second mirror having a compound reflective surface comprising a spherical convex reflective area concentric about a central flat reflection area, the second mirror being symmetrically positioned about said axis and forming the other end of the cavity and the flat area being normal to the axis; and
the first and second mirrors forming an oscillator region between a central area of the first mirror and the flat area and further forming an amplifier region within the optical cavity and around the oscillator region.

4. A gas laser comprising:
a pair of mirrors forming an optical cavity having an axis; a first mirror having a cylindrical concave reflection surface and forming one end of the cavity and symmetrically located about said axis;
the second mirror having a compound reflective surface comprising a cylindrical convex reflective area symmetrical about a central flat reflection area, the second mirror being symmetrically positioned about said axis and forming the other end of the cavity and the flat area being normal to the axis; and
the first and second mirrors forming an oscillator region between a central area of the first mirror and the flat area and further forming an amplifier region within the optical cavity and external to the oscillator region.

* * * * *